Feb. 9, 1932.  D. GREGG  1,844,155
DEVICE FOR RELIEVING BACK FIRE PRESSURES
IN SUPERCHARGED INDUCTION SYSTEMS
Filed April 10, 1928
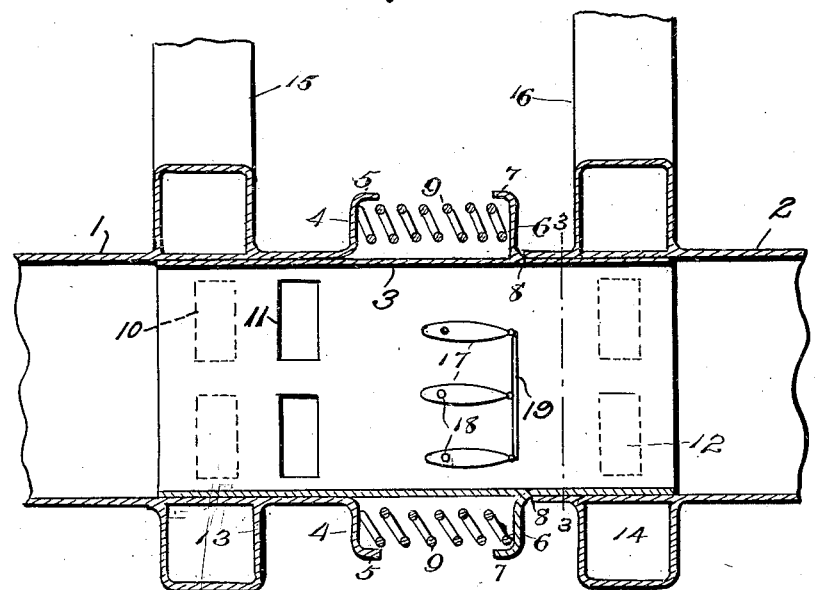
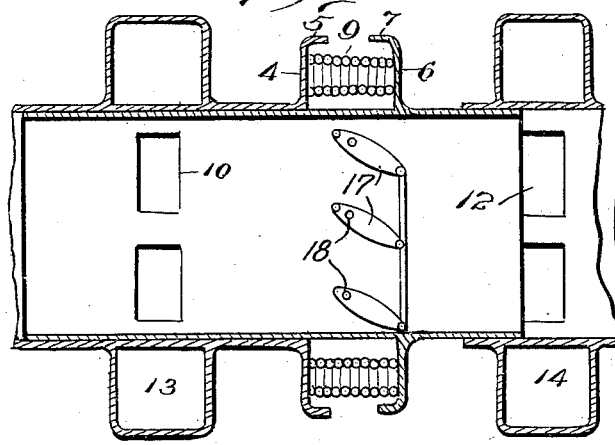
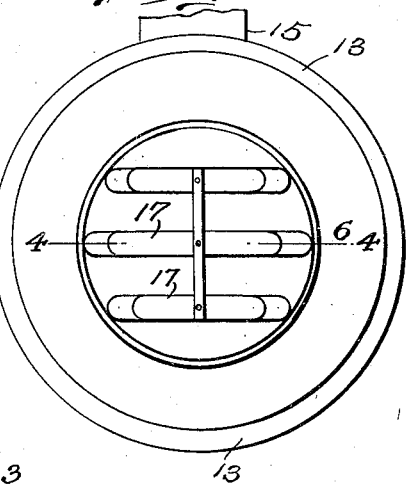
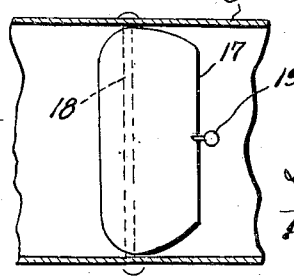
Inventor
David Gregg
By Robert H. Young Patented Feb. 9, 1932

1,844,155

UNITED STATES PATENT OFFICE

DAVID GREGG, OF FLINT, MICHIGAN

DEVICE FOR RELIEVING BACK-FIRE PRESSURES IN SUPERCHARGED INDUCTION SYSTEMS

Application filed April 10, 1928. Serial No. 268,851.

This invention relates to internal combustion engines, but more particularly to a device for preventing damage to a supercharged induction system in the event of a backfiring from the engine.

In the usual supercharged induction system, the compressor draws air and fuel through the carburetor and after compressing the same, delivers it to the engine under pressure.

When a backfire occurs, the pressure generated by the burning gas in the intake manifold, is a frequent cause of damage to the compressor and intake pipe.

This invention has for its object to incorporate in a supercharged induction system, a device for relieving the system of the harmful pressure caused by backfiring, and which simultaneously relieves the system of the pressure generated therein by the compressor.

With this object in view, the invention consists of the device for simultaneously relieving both the pressure within the system caused by the backfiring and the pressure generated by the compressor.

The invention further consists of certain novel details of construction and combinations of parts, all of which will be first fully described and afterwards specifically pointed out in the appended claims.

Referring to the accompanying drawings which illustrate a preferred embodiment of the invention—

Figure 1 is a longitudinal sectional view of the device in normal operative position;

Figure 2 is a similar view;

Figure 3 is a transverse sectional view taken on line 3—3 of Figure 1; and

Figure 4 is a fragmentary sectional view taken on line 4—4 of Figure 3.

Like numerals of reference indicate the same parts throughout the several figures in which—

1 indicates the pipe leading from the supercharger (not shown) and 2 indicates the pipe leading to the intake ports of the engines (not shown).

Interposed between the two pipes 1 and 2 and connecting and telescoping within the same, is the tubular sleeve 3, said sleeve being of a diameter to slidably move within the two adjacent ends of the two pipes 1 and 2.

Formed on the end of the pipe 1 is a flange 4 having a rim 5, and upon the sleeve 3 is formed a similar flange 6 having a rim 7. The end 8 of the pipe 2 coacts with the flange 6 so as to form a stop to limit the movement of the sleeve 3 within and toward the pipe 2.

Disposed around the flange 3 and within the space defined by the two flanges 4 and 6, are a plurality of spiral springs 9 having extension strain. The ends of said springs bear against the opposed flanges 4 and 6 so as to normally hold the flange 6 against the end 8 of the pipe 2, as shown in Figure 1.

Disposed in the pipe 1, and covered by the sleeve 3, is a series of ports 10, while disposed in the sleeve 3, is a series of ports 11, designed to register with the complemental ports 10 in the pipe 1, when said sleeve is moved from its normal position shown in Figure 1.

Disposed in the pipe 2 and normally covered by the sleeve 3, is a series of ports 12 which are adapted to be uncovered by the said sleeve upon movement thereof into position shown in Figure 2.

It may be expedient to surround each series of ports 10 and 12 with receiving chambers 13 and 14 to which are connected pipes 15 and 16, so that the gases passing through the ports 10 and 12 may be discharged at any desired points.

Disposed within the sleeve 3 at a point intermediate the two series of ports 10 and 12, is a series of vanes or shutters 17, each vane or shutter of the series being pivoted transversely in the sleeve 3, the pivotal points 18 of each vane or shutter being closer to its edge adjacent to pipe 1 which edge is toward the normal direction of flow from the supercharger (not shown). The trailing edge of these vanes or shutters 17 are hingedly connected together by a link 19, so that when the fuel mixture is flowing through the device from the supercharger toward the pipe 2, the vanes or shutters are maintained in horizontal position shown in full lines in Figure 1.

Having thus fully described the invention, its operation is as follows:

The device being positioned between the compressor and the engine, the fuel mixture flows through the same toward the engine. During this normal operation, the parts are in the position shown in Figure 1. Should a backfire occur, the pressure within the pipe 2 exceeds the normal pressure from the compressor within the pipe 1, and the vanes or shutters 17 being unstable by reason of the position of their pivots, the excess pressure and consequent flow in the reverse direction against the vanes or shutters 17, swings the same crosswise of the sleeve 3 and into position shown in Figure 2. This pressure acting against the crosswise shutters 17, communicates movement to the sleeve 3 and moves the same into position shown in Figure 2. This movement of the sleeve 3 uncovers the series of ports 12 and releases the backfire-pressure into the chamber 14. Simultaneously the series of ports 11 in the sleeve 3 is caused to register with the complemental ports 10 in the pipe 1, and the pressure from the supercharger compressor is released into the chamber 13. Upon release of these two pressures, the springs 9 move the sleeve 3 back again into normal position shown in Figure 1, and the flow from the compressor again swings the vanes or shutters 17 into normal position and the normal operation of the system is again resumed.

Having thus fully described the invention, I do not wish to be understood as limiting myself to the exact construction shown and described as the same is only illustrative and descriptive of a preferred form of the invention, but I consider myself clearly entitled to all such changes and modifications as fall within the limit and scope of the appended claims.

Having thus described my invention what I claim is—

1. A device of the character described including two pipes adapted to be interposed between a supercharger and an internal combustion engine, a tubular sleeve slidably mounted within the contiguous ends of said pipes, each of said pipes being provided with a port near the end thereof, the said sleeve normally covering said ports, resilient means for holding said sleeve in this normal position, a series of shutters pivoted within the said sleeve at a point intermediate the said ports, means for hingedly connecting all of said shutters together, said shutters being adapted to swing crosswise of the said sleeve to obstruct gas-flow through the said sleeve in one direction, the said sleeve being adapted to move within the said pipes to uncover the said ports therein.

2. A device of the character described including two pipes adapted to be interposed between a supercharger and an internal combustion engine, a tubular sleeve slidably mounted within the contiguous ends of said pipes near the end thereof, each of said pipes being provided with a port near the end thereof, the said sleeve normally covering said ports, resilient means for holding said sleeve in this normal position, a series of shutters pivoted within the said sleeve at a point intermediate the said ports, said shutters being adapted to swing crosswise of the said sleeve to obstruct gas-flow through the said sleeve in one direction, the said sleeve being adapted to move within the said pipes to uncover the said ports therein.

3. A device of the character described including two pipes adapted to be interposed between a supercharger and an internal combustion engine, a sleeve slidably mounted within the contiguous ends of said pipes, each of said pipes being provided with a port near the end thereof, the said sleeve normally covering said ports, resilient means for holding said sleeve in its normal position, a shutter pivoted within the said sleeve at a point intermediate the said ports, said shutter being adapted to swing crosswise of the said sleeve to obstruct gas-flow through the said sleeve in one direction, the said sleeve being adapted to move within the said pipes to uncover the said ports therein.

4. A device of the character described including two pipes adapted to be interposed between a supercharger and an internal combustion engine, a sleeve slidably mounted within the contiguous ends of said pipes, each of said pipes being provided with a port near the end thereof, the said sleeve normally covering said ports, means for holding said sleeve in this normal position, means within the said sleeve adapted to obstruct gas-flow through the said sleeve in one direction, the said sleeve being adapted to move within the said pipes to uncover the said ports therein.

5. A device of the character described including two pipes adapted to be interposed between a supercharger and an internal combustion engine, a sleeve slidably mounted within the contiguous ends of said pipes, each of said pipes being provided with a port near the end thereof, the said sleeve normally covering said ports, means within the said sleeve adapted to obstruct gas-flow through the said sleeve in one direction, the said sleeve being adapted to move within the said pipes to uncover the said ports therein.

6. A device of the character described including two pipes adapted to be interposed between a supercharger and an internal combustion engine, means slidably mounted within the contiguous ends of said pipes, each of said pipes being provided with a port near the end thereof, said means normally covering said ports, means within said first mentioned means adapted to obstruct gas-flow through the first mentioned means in one direction, the first mentioned means being adapted to move within the said pipes to uncover the said ports therein.

7. A device of the character described including two pipes adapted to be interposed between a supercharger and an internal combustion engine, each of said pipes being provided with a port, means within the pipes for covering and uncovering the said ports, means within the device for obstructing gas-flow through the device in one direction and to actuate the first mentioned means to uncover said ports.

8. The combination with an internal combustion engine supplied by a supercharger, of means comprising a by-pass relief mechanism interposed between said supercharger and said engine for automatically releasing excessive pressures generated by the back-firing of said engine.

9. The combination with an internal combustion engine supplied by a supercharger, of a valved by-pass interposed between said supercharger and said engine, and means responsive to excess pressure generated by the back-firing of the engine for opening the valve of the by-pass to release said excess pressure therethrough.

10. A device for relieving back-fire pressure in the fuel line of an internal combustion engine consisting of vent means in said fuel line including pressure-escape ports, a pressure-actuated slide for covering and uncovering said ports, means for holding the slide normally in a position covering said ports, and means carried by the slide and responsive to the combination of forces due to back-fire pressure and gravity for closing the passageway in said fuel line.

11. A device for relieving back-fire pressure in a supercharged induction system comprising the combination with an internal combustion engine and a supercharger, of vent means interposed between said supercharger and said engine and responsive to the excess pressures generated by the back-firing of the engine for automatically opening the vent to permit escape of said excess pressures.

12. A device for relieving back-fire pressure in supercharged induction systems comprising the combination with an internal combustion engine supplied by a supercharger, of a normally closed valve in the pipe line between engine and supercharger, and valve-opening means responsive to excess pressure generated by the back-firing of the engine for opening the said valve.

In testimony whereof I affix my signature.

DAVID GREGG.